United States Patent
Rogalski et al.

(10) Patent No.: US 6,962,167 B2
(45) Date of Patent: Nov. 8, 2005

(54) CHOKE VALVE

(75) Inventors: Markus Rogalski, Filderstadt (DE); Hannes Wirtl, Schongau (DE); Herbert Frisch, Göppingen (DE)

(73) Assignee: Festo AG & Co., Esslingen (DE)

(*) Notice: Subject to any disclaimer, the term of this patent is extended or adjusted under 35 U.S.C. 154(b) by 220 days.

(21) Appl. No.: 10/361,894

(22) Filed: Feb. 10, 2003

(65) Prior Publication Data
US 2003/0155017 A1    Aug. 21, 2003

(30) Foreign Application Priority Data
Feb. 19, 2002  (EP) ................................. 02003703

(51) Int. Cl.⁷ ............................................. F16K 47/10
(52) U.S. Cl. ..................... 137/599.05; 137/599.16; 137/601.05; 251/207
(58) Field of Search .................. 137/599.05 I, 599.16, 137/601.01, 599.11, 601.05; 251/207

(56) References Cited

U.S. PATENT DOCUMENTS

| | | | | |
|---|---|---|---|---|
| 2,229,903 A | * | 1/1941 | Schmohl et al. | 137/599.05 |
| 2,855,953 A | * | 10/1958 | Lamar | 137/599.17 |
| 3,038,449 A | * | 6/1962 | Murphy, Jr. et al. | 137/599.07 |
| 4,643,215 A | * | 2/1987 | Phlipot et al. | 251/207 |
| 4,858,636 A | * | 8/1989 | Adkins | 137/601.18 |
| 5,150,690 A | * | 9/1992 | Carter et al. | 137/599.05 |
| 5,329,965 A | * | 7/1994 | Gordon | 137/599.07 |

FOREIGN PATENT DOCUMENTS

| | | |
|---|---|---|
| DE | 1175181 B | 8/1964 |
| DE | GM6809670 | 4/1969 |
| DE | 2140191 A | 2/1972 |
| DE | 052531617 | 1/1976 |
| DE | 19807503 A1 | 8/1999 |
| DE | 10049091 A1 | 5/2002 |
| EP | 0842839 A2 | 5/1998 |

OTHER PUBLICATIONS

Panzer, Paul, et al., "Arbeitsbuch der Ölhydraulik", 2. Auflage, Krauskopf-Verlag, 1969, Seite 359.
Will, Dieter, et al., "Einführung in die Hydraulik und Pneumatik", 1. Auflage, VEB-Verlag Technik, Berlin, 1981, Seiten 156-157.
Meixner, H., et al., "Einführung in die Pneumatik", 2. Auflage, Berlin, Seite 132 (Undated).

* cited by examiner

Primary Examiner—Stephen M. Hepperle
(74) Attorney, Agent, or Firm—Hoffmann & Baron, LLP

(57) ABSTRACT

A choke valve having a coarse setting choke means and a fine setting choke means placed in parallel to it. The coarse setting choke means is able to be switched over in stages between different degrees of choking with different choke cross sections. The fine setting choke means renders possible a stepless adjustment of its choke cross section.

18 Claims, 3 Drawing Sheets

CHOKE VALVE

BACKGROUND OF THE INVENTION

The invention relates to a choke valve using which different choke cross sections may be set in order to render possible a variable preset of the volumetric flow of a fluid, more particularly compressed air.

THE PRIOR ART

In practically all pneumatic control systems choke valves, which are also termed flow control valves are employed in order to influence the volumetric flow. By changing the volumetric flow it is for example possible to change the speed of movement of pneumatic drives.

Conventional choke valves, as for example described in the textbook "Einführung in die Pneumatik", Meixner/Knobler, page 132, possess a rotary actuating member, which is fitted with a conical choke body moved into an opening to a greater or lesser extent in accordance with the angular position set so that the fluid flowing through the choke must flow through different sizes of cross sections.

One disadvantage of such known choke valves is the extremely limited reproducibility of the desired settings over a large desired range of adjustment. In order to cope with such a large setting range a large number of rotations of the rotary actuating member is required, something which makes it extremely difficult to return to a position, which has once been found, after a replacement of the choke valve, due to a defect for instance.

Therefore in accordance with the German patent publication 6,809,670 (utility model), the German patent publication 2,140,191 A1, the German patent publication 1,175, 181 B1 and the German patent application 10,049,091.3 with an earlier priority there has already been a proposal to replace a choke body, which is able to be rotated and moved axially, by a setting member which may be only rotated while being axially fixed, with which a selection of choke passages may be made which have different cross sections. Thus for example the German patent publication 6,809,670 (utility model) discloses a disk-like setting member having a plurality of choke passages with different cross sections able to be placed in the fluid flow selectively. An advantage with choke valves is that the holes defining the choke apertures may be produced extremely exactly. However there is that a large number of different choke passages must be provided in order to render possible a satisfactory possibility of continuous adjustment of the choking intensity. This results in disadvantages as regards the overall size.

In the German patent publication 2,531,617 there has already been a proposal to set different choke cross sections by the provision of a choke groove in the form of circular arc, which is provided with several plates with holes in them and separated by chambers. However, this does not either provide a solution to the set of problems indicated.

SHORT SUMMARY OF THE INVENTION

Accordingly one object of the present invention is to create a choke valve which despite its compact dimensions renders possible fine adjustment to settings which are to a maximum extent reproducible for different intensities of the choking effect.

In order to achieve these and/or other objects appearing from the specification, claims and/or drawings, in the present invention a choke valve has a coarse setting choke means able to be reset in stages between different degrees of choking which have different choke cross sections and furthermore a fine setting choke means connected in parallel to the coarse setting choke means and able to be steplessly adjusted as regards its choke cross section.

In the case of this choke valve it is possible for an extremely wide setting range to be employed using a relatively small number of individually selectable degrees of choking of the coarse setting choke means, the parallel connected fine setting choke means rendering it possible to use cross sections occurring between the respectively sequentially occurring degrees of choking. Since the fine setting choke means is always limited to the difference in cross section between two sequentially occurring degrees of choking the fine setting range may be relatively narrow, something which favors fine adjustment and more particularly the reproducibility of a desired setting substantially. Furthermore, if required extremely compact dimensions of the choke valve are available.

The European patent publication 0 842 839 B1 discloses a damping valve arrangement, in the case of which a non-externally set choke is connected in parallel with a choke having a setting screw for fine adjustment. Switching over between several degrees of choking is however not provided for. The setting screw merely serves to perform fine adjustment of the permanently set choke which is present.

Further advantageous developments of the invention are defined in the claims.

It is convenient for the two choke means to be so designed that within the overall adjustment range of the choking intensities made available by the two choke means steplessly presetting of any desired choking intensity is possible. It is referred generally to have a linear, stepless characteristic. The setting of the desired choke value is particularly simple if the setting range of the fine setting choke means exactly includes within it the difference in cross section between the respectively sequentially occurring degrees of choking of the coarse setting choke means. It is particularly advantageous in this respect for the fine setting choke means to possess a rotary actuating member for the stepless adjustment of the choke cross section, whose range of setting amounts to 360° at the most so that as part of fine adjustment no more than one rotation of the rotary actuating member is necessary. Preferably, the maximum necessary adjustment range of the rotary actuating member lies between 270° and 340°.

In the case of a preferred design the coarse setting choke means possesses, for presetting the individual degrees of choking, several choke passages having different choke cross sections. The same are so individually selectable using a suitably positioned rotary actuating member of the coarse setting choke means that the fluid, on flowing through the coarse setting choke means, merely goes through the respectively selected choke passage.

If the rotary actuating member of the coarse setting choke means is able to be positioned in the selected positions using detent or catch means, particularly exact setting becomes possible. Furthermore, by "keeping count" of the detent effects extremely simple resetting to the desired degree of choking is possible, if no additional scale is provided. A scale is however preferred in order to render the setting operation particularly simple.

The rotary actuating member of the coarse setting choke means preferably defines a transfer duct, which may be so positioned using by setting the angular position of the rotary actuating member that it connects the selected choke passage, which is connected with a connection duct of the choke valve, with an other connection duct of the choke valve.

In the case of the respectively selected setting the transfer duct conveniently respectively provides a connection between an opening of the above mentioned connection duct and an opening of the respectively selected choke passage. These openings are preferably located on the floor of a transfer chamber, on which the rotary actuating member may ride on rotation. In order to prevent undesired leakage the floor of the transfer chamber is preferably constituted by a perforated choke disk, which among other features, has choke passages of different cross section extending through it. The structure of the choke disk is more particularly a two-layer structure with a soft elastic sealing layer, which may rest on the valve housing in order to brace a stiffer but however yielding anti-friction layer against the rotary actuating member.

In order to set to the respectively desired degree of choking the coarse setting choke means preferably comprises a rotary actuating member. The fine setting choke means is preferably provided on it. Thus it is possible to ensure in a particularly simple manner that the choking intensity set using the fine setting choke means remains constant on changing the degree of choking of the coarse setting choke means. This is something which facilitates adjustment.

The fine setting choke means preferably possesses a choke duct extending in the rotary actuating member of the coarse setting choke means, such choke duct being provided with a choke member (for the fine adjustment of the-choking intensity) which is able to be rotated for adjustment on this rotary actuating member. The actuation of the choke member is preferably implemented using a rotary actuating member of the fine setting choke means, whose axis of rotation extends coaxially to that of the rotary actuating member of the coarse setting choke means.

A particularly compact arrangement is produced if the fluid flowing through the fine setting choke means may flow through choke passages which are currently not selected. It is accordingly possible to do without a separate duct extending around the coarse setting choke means.

In accordance with one convenient design the choke valve possesses a valve housing, on which two connection ducts, which are accessible from the outside, are provided, between which the two choke means are connected. The choke means are preferably located in a principal body of the valve housing, which also possesses one of the connection ducts. The other connection duct is preferably formed on a pivotal part of the valve housing rotatably mounted on the principal body so that it is possible to accordingly change the outlet direction of the associated connection duct in accordance with the particular circumstances. Preferably these above mentioned components constitute a so-called pivotal screw connection as is for example described in the textbook "Arbeitsbuch der Ölhydraulik", by Panzer/Beitler, second edition, published by Krauskopf-Verlag, 1969, page 359.

Finally a bypass duct with associated check valve means may also be provided between the two connection ducts. It is in this manner that all-in-all an adjustable choke valve with a check valve is provided. Such types of valves are described in the textbook "Einfuehrung in die Hydraulik und Pneumatik", first edition, published by VER-Verlag, Berlin, 1981, pages 156/157.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENT OF THE INVENTION

The choke valve 1 illustrated by way of example is so designed as regards technical features of connecting it that it may be placed on a connection line between a fluid power component 3 and a fluid line 4. In the case of the fluid power component 3 it is for example a question of a fluid powered drive or a valve. The fluid line 4 may be a rigid pipe but as a rule will be a flexible pressure medium hose. A fluid connection may be produced by way of choke valve between the fluid power component 3 and the fluid duct 4. The choke valve is suitable for pneumatic and for hydraulic applications.

Figure 1:
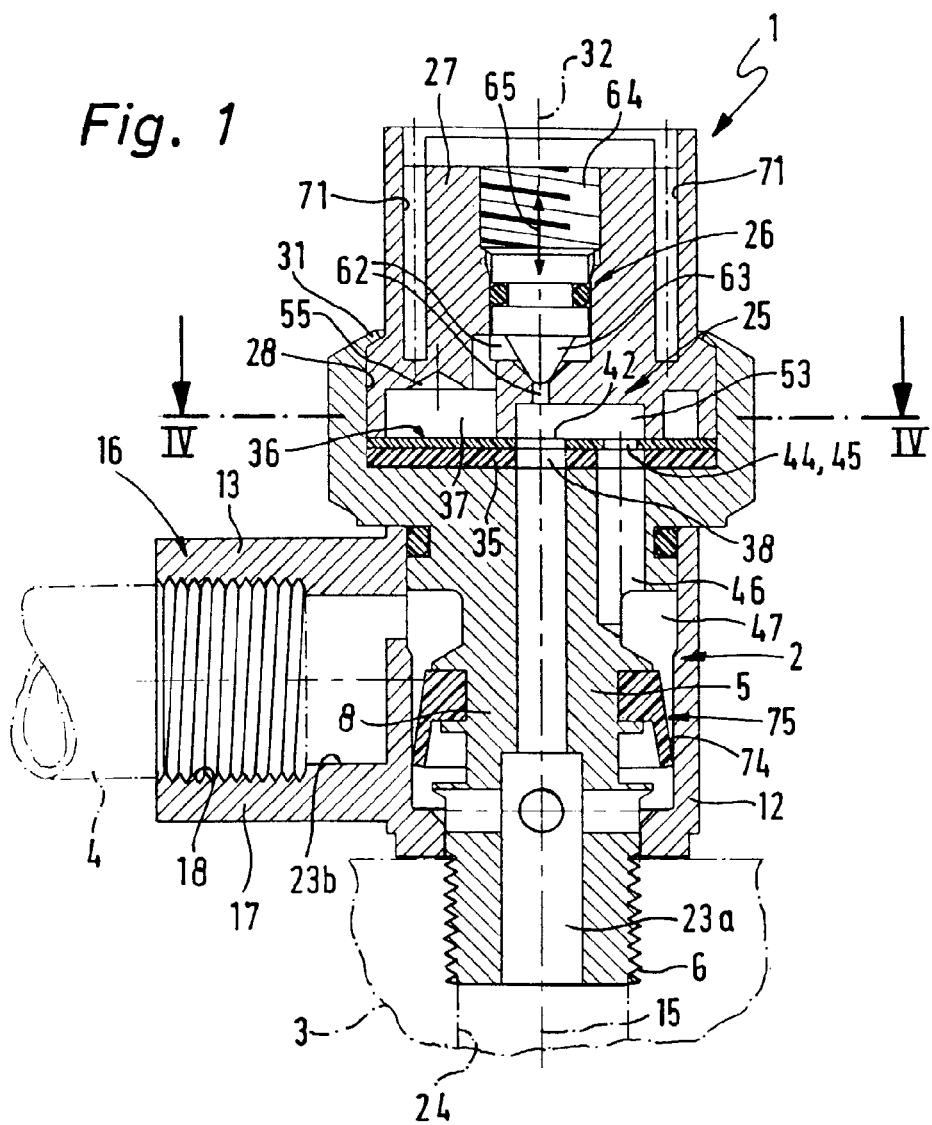
FIG. 1 is a longitudinal section taken through a preferred embodiment of the choke valve of the invention on the section line I—I of FIG. 4.
Figure 4:
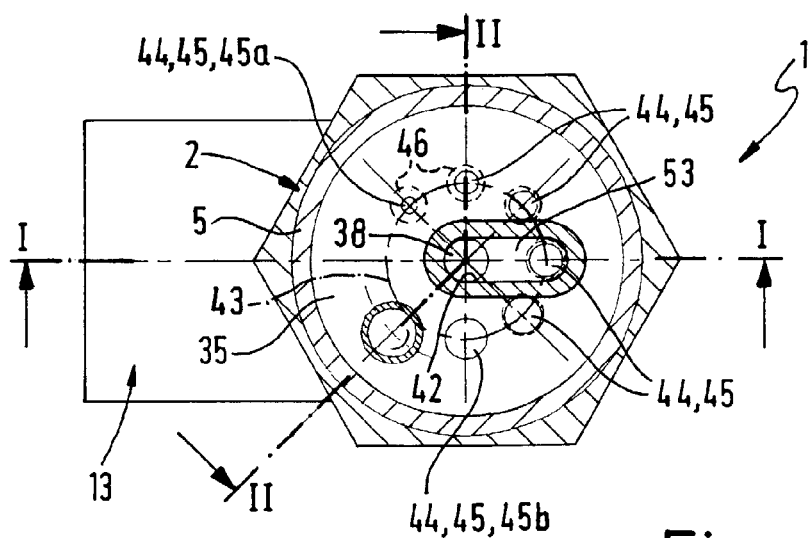
FIG. 4 shows a cross section of the choke valve on the line IV—IV of FIG. 1.
Figure 2:
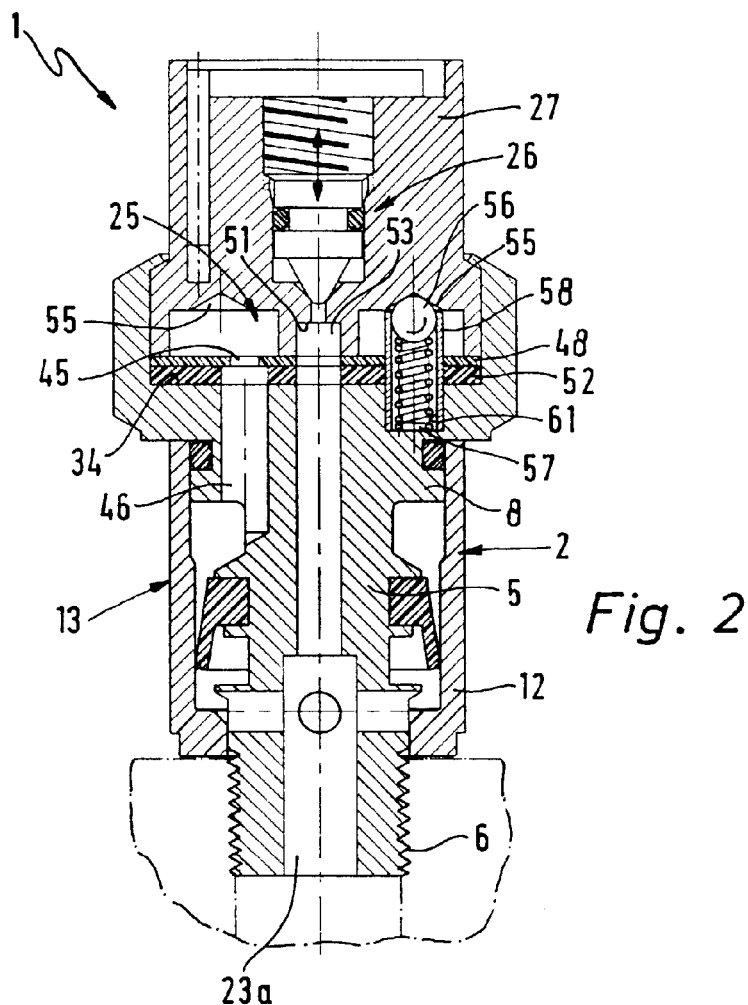
FIG. 2 is a further longitudinal section taken through the choke valve in another section plane, which is indicated in FIG. 4 by the line II—II.
Figure 6:
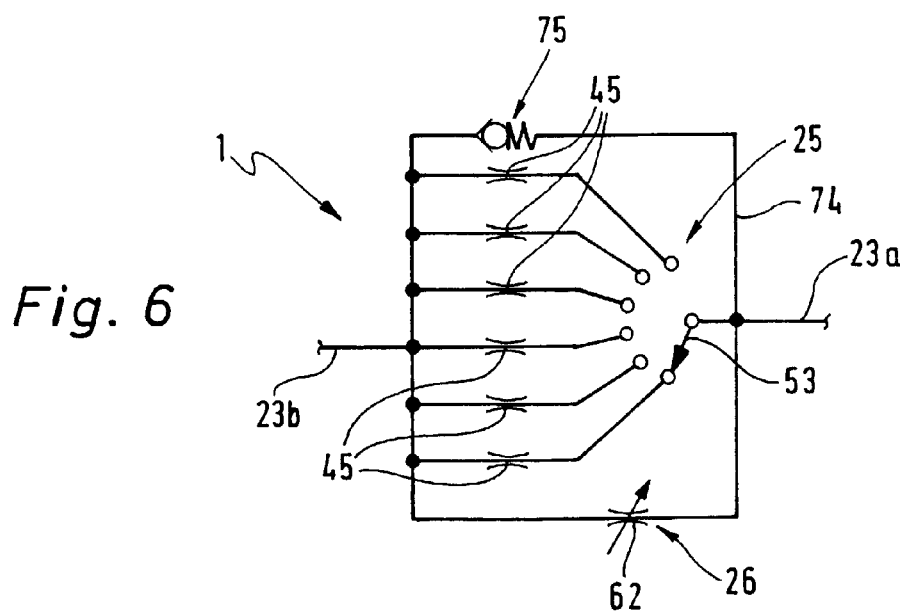
FIG. 6 is a diagrammatic representation of the circuit diagram of the choke valve.
Figure 3:
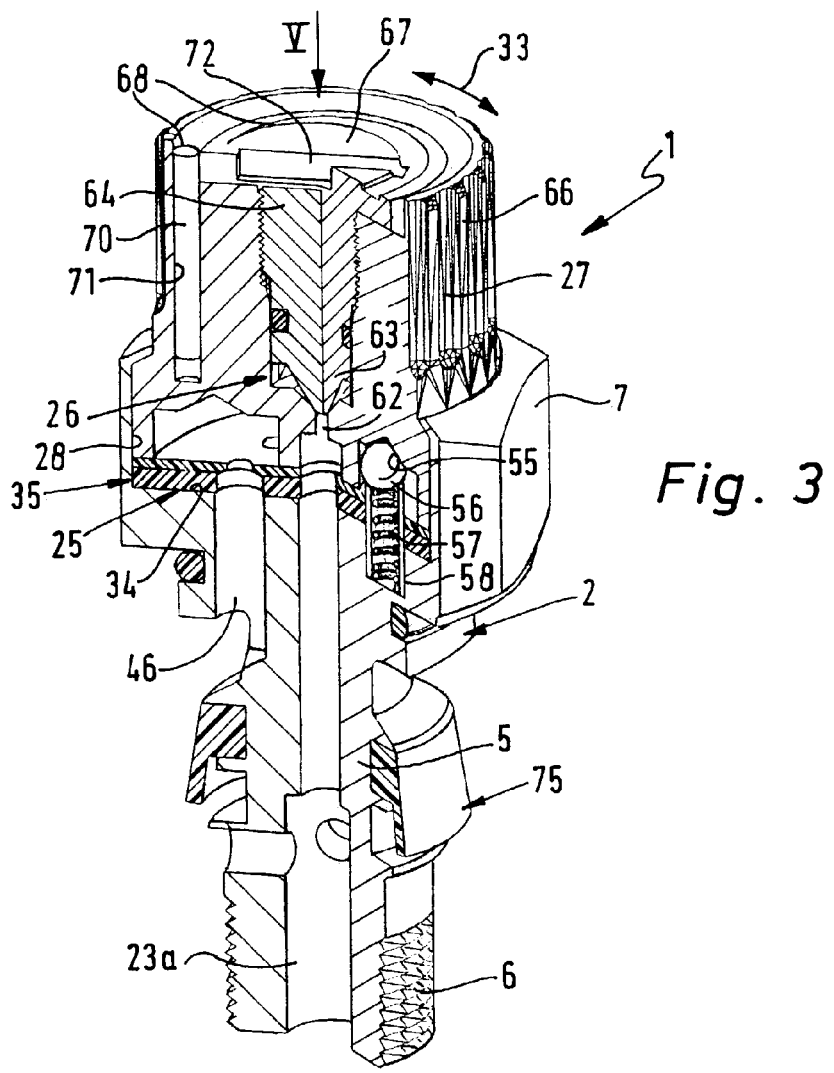
FIG. 3 shows the choke valve as sectioned by the line II—II, but this time omitting the preferably provided pivotal part of the valve housing.
Figure 5:
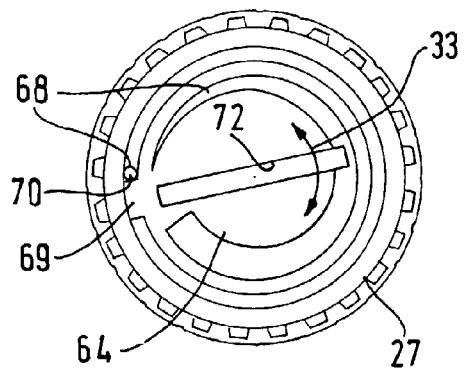
FIG. 5 shows a plan view of the choke valve looking in the direction of the arrow V in FIGS. 2 and 3.

The choke valve 1 possesses a valve housing generally referenced 2 having an elongated principal body which is hollow from one end to the other, such body preferably being in the form of a hollow screw. At the front end, which in FIGS. 1 through 3 is illustrated facing downward the principal body 5 is provided with a cylindrical attachment section 6 bearing a male thread, which section 6 may be screwed into a threaded hole in the fluid power component 3. The terminal section 7 on the head end and depicted at the top in FIGS. 1 through 3, of the principal body 5 has a polygonal outline or is designed in some other way so that a spanner or wrench may be applied externally to it for tightening the screw means on the fluid power component 3.

Between the attachment section 6 and the terminal section 7 on the head end there is a further longitudinal section of the principal body 5, which is in the following will be termed the bearing section 8. On this bearing section 8 a ring-like or bushing-like bearing body 12 is mounted coaxially, which is a component of the pivotal part 13 of the valve housing 2, which is able to be rotated in relation to the principal body 5 just as may be desired. The axis of rotation coincides with the longitudinal axis 15 of the principal body 5. On turning the pivotal part 13 the bearing body 12 is rotated on the bearing section 8 of the principal body 5.

The pivotal part 13 is designed for the connection of the above mentioned line 4. It has means defining a fluid line connection 16 aligned athwart the longitudinal axis 15 of the principal body 5. In the working example there is for this purpose a connection nipple 17 extending radially from the bearing body 12 and defining a connection opening 18, into which the fluid line 4 may be screwed in a sealing fashion. As an alternative it is possible for the fluid line connection 16 to be provided with a plug connection means, which permit a simple detachable plug connection of the fluid line 4.

Owing to the pivotal part 13 the design of the valve housing 2 resembles a pivotal screw means. The user has a possibility of positioning the connection nipple 17 at a desired angle along the periphery of the principal body 5 that its alignment is optimum as regards the fluid line 4 to be connected. The choke valve 1 may however also be designed in a form without a pivotal part. The connection features described and the features of the pivotal 13 part to be explained in the following may be then provided directly on the principal body 5.

A longitudinal section of the cavity extending through the principal body 5 constitutes a first connection duct 23a. This duct opens at the end face of the attachment section 6 and communicates in the mounted state on the fluid power component 3 with a pressure medium duct 24 formed therein.

The connection opening 18 belongs to a second connection duct 23b. It communicates with the connected fluid line 4.

Owing to there being two parallel connected choke means the two connection ducts 23a and 23b are connected with each other in the interior of the choke valve 1 for transfer of fluid. The one choke means is able to be switched over in steps between different degrees of choking with different choke cross sections and will be termed the coarse setting choke means 25. The second choke means, connected functionally parallel thereto, is designed for a stepless adjustment of the choke cross section provided by it and will be termed the fine setting choke means 26.

The two choke means 25 and 26 together cover an overall adjustment range, within which any desired choking intensity may be set. This is achieved more particularly because the differences in cross section or lumen between the degrees of choking following each other of the coarse setting choke means 25 and the stepless adjustment range covered by the fine setting choke means 26—in the following referred to as the "fine adjustment range" are so related to each other that using the fine adjustment range the differences in cross section between the degrees of choking, following each other in size, are covered in any case.

Preferably the arrangement is such that the degrees of choke following one another respectively differ by identical volumetric flow differences and that the choking characteristic of the fine adjustment choke means is linear so that overall a continuous, linear adjustment characteristic may be produced with the choke valve 1.

The coarse setting choke means 25 possesses a rotary actuating member 27, preferably in the form of a rotary knob, which fits into a socket 28 coaxially formed in a terminal section 17 on the head end of the principal body 5. The rotary actuating member 27 is axially locked by means of a crimped holding section 31 of the principal body 5 or by other attachment features in the socket 28 while however being able to be rotated in the socket 28. The axis of rotation 32 of the gear setting rotary actuating member 27 coincides with the longitudinal axis 15 of the principal body 5. The possible rotary movement is indicated in the drawing by a double arrow 33.

A disk-like part, termed a choke disk 35, is arranged in the socket 28 coaxially between the rotary actuating member 27 and the base face 34, facing same, of the socket 28. This choke disk possesses at least partially elastic properties and is clamped between the rotary actuating member 27 and the principal body 5. It constitutes the floor 36 of a transfer chamber 37, which is defined between the choke disk 35 and the rotary actuating member 27.

The first connection duct 23a extends through the principal body 5 as far as the choke disk 35, in which it is continued in the form of an aligned first through hole 38 in order to open at a first opening 42 at a central point on the floor 36 into the transfer chamber 37.

Along an arcuate line 43, whose center is in the first opening 42 or, respectively, on the longitudinal axis 15 a plurality of second through the holes are evenly distributed 4 on the choke disk 35. They constitute choke passages 45 of the coarse setting choke means 25 and define the above mentioned degrees of choking since they have the different choke cross sections. Along the row of holes the choke cross sections vary in size from a choke passage 45a with the smallest choke cross section to the choke passage 45b having the largest choke cross section in regular increments in cross sectional size.

Each choke passage 45 communicates at one end with the second connection duct 23b. For this purpose there is a set of connecting ducts 46 in the principal body 5 corresponding to the number of choke passages 45, such connecting ducts extending in parallelism to the first connection duct 23a and being distributed about the same. They all lead to a plenum 47, which is connected with the second connection duct 23b. In the working example the plenum 47 is an annular space arranged coaxially about the bearing body 5 and which is defined between the bearing body 12 and the principal body 5 and into which the second connection duct 23b opens peripherally.

The cross sectional dimensions of the connecting ducts 46 may be the same as each other, if they are at least the same as the choke cross section of the largest passage 45a. The actually desired choke cross section may be made dependent on the correspondingly formed choke passages 45. Therefore there is more particularly the possibility of selective use of different choke disks 35 to provide for different choke characteristics or volumetric flow rates.

Furthermore there is the advantage of designing the choke passages 45 like perforated plates or baffles with a small "duct length", something which is advantageous as regards precision. In the working embodiment this is additionally favored because the choke disk 35 has a multi-layer structure, the choke passages 45 being defined by a layer consisting of stiff plastic material, which in the following will be termed the choke layer 48. It is relatively thin so that in addition to the above mentioned precision of choking there is furthermore the effect that the choke layer 48 may be extremely readily deformed so that it may make snug engagement with the facing end face of the rotary actuating member 27 in an optimum manner.

A second layer of the choke disk 35 is located on the side, facing the base face 34, of the choke layer 48. It is here a question of a softly elastic sealing layer 52 more particularly made of rubber-elastic material, such layer having apertures communicating with the choke passages 45 and resting against the base face 34 of the socket 28 with a sealing effect. Owing to the rubber-like elasticity the above mentioned biasing or bracing action is produced, which ensures optimum sealing contact with the components, resting on the choke disk 35, of the choke valve 1.

All choke passages 45 open on the side, which is opposite to their connecting duct 46, into the transfer chamber 37.

The rotary actuating member 27 is provided with a groove-like recess 51 which is open to the floor 36) on the end face facing the floor 36 of the transfer chamber 37, the rotary actuating member 27 having the rim 55 (which surrounds the opening of the recess 51) in engagement with the floor 36 so that a transfer duct 53 is formed.

The recess 51 covers the first opening 42 at all times so that the transfer duct 53 is constantly in communication with the first connection duct 23a.

The recess 51 extends radially in relation to the axis 32 of rotation of rotation and in this respect at least as far as the row of holes lying on the arcuate line 43. By manually turning the rotary actuating member 27 it is accordingly possible to so position the transfer duct 53 to obtain the individual degrees of choking that at the same time it is connected with the first opening 42 and one of the choke passages 45. The other choke passages 45 then open respectively clear of the transfer duct 43 into the transfer chamber 37. On turning the rotary actuating member the rim 54 will slide on the floor 36, which extends perpendicularly to the axis 32 of rotation, of the transfer chamber 37.

It is accordingly possible to so position the rotary actuating member 27 that any particular one of the choke passages 45 may be selected for the choking operation. A fluid supplied for example to the first connection duct 23a will flow via the first through hole 38 into the transfer duct 52, will flow through it as far as the selected choke passage 45, will pass through this selected choke passage 45 into the following connecting duct 46 and thence pass by way of the plenum 47 to the second connection duct 23b.

Simply by using friction means, as for example the cooperation of the choke disk 35 and the rotary actuating member 27, it is possible to ensure that the rotary actuating member 27 dwells at the respective position of rotation. However, it is an advantage if in addition or alternatively detent means are provided, which render possible a positioning of the rotary actuating member 27 in the selected position by a releasable detent action. Such means are, as explained in the following, employed in the working example.

On the end face, turned toward the base face 34, the rotary actuating member 27 is provided with a recess defining the transfer chamber. Owing to this recess there is an arrangement, which is distributed about the axis 32 of rotation along an arc, of detent recesses 55. Each detent recess 55 corresponds to a selectable position or, respectively, degree of choking.

By means of a compression spring 57 bearing against the principal body 5 a preferably ball-like detent element 56 is braced against the floor of the above mentioned recess at a radial distance from the axis 32 of rotation, which is the same as the distance of this axis 32 of rotation from the detent recesses 35. If the rotary actuating member 27 is turned, the detent element 56 will at each degree of choking, snap into one of the detent recesses 55.

Furthermore a further detent-held position is possible, in the case of the coarse setting choke means is locked. The transfer duct 53 is then so positioned that it is located between the choke passages 45a and 45b with the minimum and maximum cross section, where the is no choke passage 45. The fluid is accordingly prevented from flowing through the coarse setting choke means 25.

The detent element 56 preferably runs in a guide tube 58 in an adjustable manner. In this guide tube 58 the compression spring 57 extends as well. The guide tube 58 extends through the choke disk 35 and is held in an axial recess 61 in the principal body 5. Accordingly at the same time angular positioning and fixing in place of the choke disk 35 is ensured.

As an alternative other positioning means could be provided, which render possible the insertion of the choke disk 35 in only one possible position.

The fine setting choke means 26 is preferably provided on the rotary actuating member 27 of the coarse setting choke means 25, it being integrated in the rotary actuating member 27 in the working embodiment. It comprises a choke duct 62 between the transfer duct 53 and the section, which is clear of the transfer duct 53, of the transfer chamber 37. Since this last named chamber section is connected by way of choke passages 45, which is are currently not selected for a choking operation, with the second connection duct 23b, the choke duct 62 consequently constitutes a constant fluid connection between the two connection ducts 23a and 23b, which exists parallel to this fluid connection, which is made available by the selected degree of choking by the coarse setting choke means 25.

The choke duct 62 is provided with a choke member 63 mounted so that it can be shifted in the rotary actuating member 27. The choke member 63 is in the working example permanently joined with a further rotary actuating member 64 belonging to the fine setting choke means 26. The further rotary actuating member 64 is in the working example a screw member, whose axis of turning coincides with the axis 32 of turning of the other rotary actuating member 27. On rotation of the further rotary actuating member 64 the choke member 63 will perform an axial setting movement as indicated by the double arrow, in the rotary actuating member 27 of the coarse setting choke means 25, by which movement the choke cross section, defined by the choke duct 62, may be steplessly changed and may be reset as necessary.

Accordingly there is the possibility of steplessly positioning the rotary actuating member 27 of the coarse setting choke means 25 to achieve a coarse or rough adjustment to the desired choking intensity and of finely adjusting to the actually necessary choking intensity by suitable positioning of the choke member 63.

The rotary actuating member 27 of the coarse setting choke means 25 has handle portion 66, which may be held in the hand, extending out from the end section 7 of the head end, of the principal body 5. The further rotary actuating member 64 possesses a further handle portion 67, which is preferably accessible from the end side, axially opposite to the principal body 5, of the rotary actuating member 27. In the working example the further rotary actuating member 64 is screwed from its end side into the rotary actuating member 27 of the coarse setting choke means 25 and has an axially aligned slot 72, to which a screwing tool may be applied in order to cause rotary actuation of the further rotary actuating member 64 in relation to the rotary actuating member 27 of the coarse setting choke means 25. It is in this manner that the two choke means may be set independently of one another.

Preferably the range of the further rotary actuating member 64 of the fine setting choke means 26 is so limited by suitable means that at the most one rotation, that is to say an angular displacement of 360° maximum, is possible. In the working example the range of adjustment lies between 270° and 340°. Accordingly accurate resetting in an exact simple manner is possible. Using mutually corresponding display means 68, as for example in the form of suitable markings or the combination of a scale and pointer it is possible for the accuracy or reproducibility of setting to be increased.

In the working embodiment the maximum setting range of the further rotary actuating member 64 is achieved using a radial projection 69 arranged on the latter, in whose path of displacement an abutment body 70 is placed, which is fixedly connected with the rotary actuating member 27 of the coarse setting choke means 25. The abutment body 70 is in the working example pin-like and is held in a complementary receiving recess 71 like a blind hole in the rotary actuating member 27.

In order during the manufacture of the choke valve 1 to be able to optimally set the terminal position of the adjustment range of the further rotary actuating member 64 several receiving recesses 71 are present on the rotary actuating member 27 are distributed in the peripheral direction, the abutment body 70 being inserted into the respectively suitable receiving recess 71.

The choke valve 1 may be designed in the form of a plain choke valve. However, many applications call for a combined choking and check valve function, the working example indicating that such requirements may be taken into account by providing a bypass duct 74 between the two connection ducts 23*a* and 23*b*, such bypass being provided with check valve means 75. This ensures that there is a so-called check choke valve.

The check valve means 75 may as illustrated be constituted by a check valve cuff which is so designed that it renders possible fluid flow from the second connection duct 23*b* to the first connection duct 23*a* bypassing the two choke means 25 and 26, whereas it prevents flow in the opposite direction so that the fluid is then forced to pass through the choke means 25 and 26.

What is claimed is:

1. A choke valve having a coarse setting choke means able to be set in stages between different degrees of choking which have different choke cross sections and furthermore a fine setting choke means connected in parallel to the coarse setting choke means and able to be steplessly adjusted as regards its choke cross section, wherein said coarse setting choke means comprises an adjustable actuating member for setting the degrees of choking and, wherein the fine setting choke means possesses a rotary actuating member for the setting of the choke cross section, the adjustment range of such rotary actuating member being limited by suitable means to 360° maximum.

2. The choke valve as set forth in claim 1, wherein the rotary actuating member is screw member.

3. The choke valve as set forth in claim 1, comprising a valve housing having a first and a second connection duct for the supply and the removal of a fluid.

4. A choke valve having a coarse setting choke means able to be set in stages between different degrees of choking which have different choke cross sections and furthermore a fine setting choke means connected in parallel to the coarse setting choke means and able to be steplessly adjusted as regards its choke cross section, said choke valve comprising a valve housing having a first and a second connection duct for the supply and the removal of a fluid and wherein the coarse setting choke means comprises several choke passages having different choke cross sections, which are able to be selected by means of a suitably positionable rotary actuating member of the coarse setting choke means in order to select the individually desired choke passage leading to a fluid connection between the two connection ducts.

5. The choke valve as set forth in claim 4, wherein the rotary actuating member of the coarse setting choke means is able to be positioned in the selected positions by a detent action.

6. The choke valve as set forth in claim 4, wherein the all choke passages communicate at one end with the second connection duct and at the other end open to a transfer chamber, the rotary actuating member of the coarse setting choke means defining a transfer duct which on the one hand is constantly connected with the opening of the first connection duct and on the other hand is able to be connected by suitable positioning of the rotary actuating member with the opening of the selected choke passage.

7. The choke valve as set forth in claim 6, wherein the openings are provided in the floor, extending perpendicularly to the axis of rotation of the rotary actuating member, of the transfer chamber, at which the rotary actuating member of the coarse setting choke means engages the rim of a recess delimiting the transfer duct, such rim being able ride over the floor of the transfer chamber on rotation of the rotary actuating member.

8. The choke valve as set forth in claim 7, wherein the opening of the first connection duct is on the axis of rotation of the rotary actuating member of the coarse setting choke means, the openings of the choke passages lying on an arc, whose center is also on the axis of rotation.

9. The choke valve as set forth in claim 6, wherein the choke passages are provided on a perforated choke disk placed in the transfer chamber.

10. The choke valve as set forth in claim 9, wherein the choke disk possesses a multi-layer structure with a soft elastic sealing layer on the side facing away from the rotary actuating member and a choke layer of more rigid but still yieldingly pliant material on the side facing the rotary actuating member.

11. A choke valve having a coarse setting choke means able to be set in stages between different degrees of choking which have different choke cross sections and furthermore a fine setting choke means connected in parallel to the coarse setting choke means and able to be steplessly adjusted as regards its choke cross section, wherein the coarse setting choke means possesses a rotary actuating member for the adjustment of the degrees of choking, the fine setting choke means being provided on the rotary actuating member of the coarse setting choke means and being preferably integrated in such rotary actuating member.

12. The choke valve as set forth in claim 11, wherein the fine setting choke means possesses a choke duct extending in the rotary actuating member of the coarse setting choke means on the one hand connected with the first connection duct and on the other hand connected with the second connection duct, such choke duct being provided with a choke member, which is mounted in an adjustable manner on such rotary actuating member and serves for fine adjustment of the choking intensity.

13. The choke valve as set forth in claim 12, wherein the all choke passages communicate at one end with the second connection duct and at the other end open to a transfer chamber, the rotary actuating member of the coarse setting choke means defining a transfer duct which on the one hand is constantly connected with the opening of the first connection duct and on the other hand is able to be connected by suitable positioning of the rotary actuating member with the opening of the selected choke passage and wherein the choke duct communicates at one end with the transfer duct and at the other end with the transfer chamber clear of the transfer duct so that fluid moving through the fine setting choke means may flow through the choke passages which are not selected.

14. A choke valve having a coarse setting choke means able to be set in stages between different degrees of choking which have different choke cross sections and furthermore a fine setting choke means connected in parallel to the coarse setting choke means and able to be steplessly adjusted as regards its choke cross section, said choke valve comprising a valve housing having a first and a second connection duct for the supply and the removal of a fluid and wherein the valve housing comprises a principal body having the two choke means and a pivotal part mounted in a rotatable manner on the principal body, the one connection duct being provided in the principal body and the other connection duct being provided in the pivotal part.

15. A choke valve having a coarse setting choke means able to be set in stages between different degrees of choking which have different choke cross sections and furthermore a fine setting choke means connected in parallel to the coarse setting choke means and able to be steplessly adjusted as regards its choke cross section, said choke valve comprising a valve housing having a first and a second connection duct for the supply and the removal of a fluid and at least one bypass duct extending between the two connection ducts and having associated check valve means.

16. The choke valve as set forth in claim 1, wherein the differences in cross section between the degrees of choking sequentially following each other in size, of the coarse setting choke means and the range of setting of the fine setting choke means are so matched that within the overall adjustment range produced a stepless presetting of any desired choking intensities is possible.

17. The choke valve as set forth in claim 16, wherein the adjustment characteristic is constant and linear within the overall adjustment range.

18. The choke valve as set forth in claim 1, wherein the range of adjustment of the fine setting choke means exactly matches the difference in cross section between the degrees of choking sequentially following each other in size of the coarse setting choke means.

* * * * *